United States Patent [19]

Boyd

[11] Patent Number: 4,693,343
[45] Date of Patent: Sep. 15, 1987

[54] MULTI-LOBED RECTANGULAR SEALING RING

[75] Inventor: Richard M. Boyd, St. Louis Park, Minn.

[73] Assignee: Quadion Corporation, Minneapolis, Minn.

[21] Appl. No.: 744,055

[22] Filed: Jun. 12, 1985

[51] Int. Cl.$^4$ .................................................. F16J 15/22
[52] U.S. Cl. ........................... 188/322.17; 267/64.11; 267/129; 277/209
[58] Field of Search ............ 267/64.11, 64.12, 64.13, 267/64.14, 64.15, 64.16, 64.17, 64.18, 64.19, 64.21, 64.22, 64.23, 64.24, 64.25, 64.26, 64.27, 64.28, 120, 121, 129; 188/322.16, 322.17, 322.18; 277/205, 206 R, 206 A, 209, 210, 213

[56] References Cited

U.S. PATENT DOCUMENTS

| | | | |
|---|---|---|---|
| 2,954,264 | 9/1960 | Tisch et al. | 277/209 |
| 2,983,533 | 5/1961 | Tisch et al. | 277/209 |
| 3,550,990 | 12/1970 | Rentschler et al. | 277/205 |
| 3,621,952 | 11/1971 | Long et al. | 188/322.17 |
| 3,642,293 | 2/1972 | Woodling | 277/206 A |
| 3,854,733 | 12/1974 | Wilson | 277/209 X |
| 3,854,737 | 12/1974 | Gilliam, Sr. | 277/205 |
| 3,909,019 | 9/1975 | Leko | 277/209 |
| 4,067,585 | 1/1978 | Rode | 277/205 X |
| 4,116,452 | 9/1978 | Schanz | 277/205 |
| 4,121,843 | 10/1978 | Halling | 277/206 R X |
| 4,199,158 | 4/1980 | de Munck | 277/205 |
| 4,368,894 | 1/1983 | Parmann | 277/209 X |

FOREIGN PATENT DOCUMENTS 2738809  3/1979  Fed. Rep. of Germany ...... 277/209

Primary Examiner—George E. A. Halvosa
Assistant Examiner—M. C. Graham
Attorney, Agent, or Firm—Schroeder & Siegfried

[57] ABSTRACT

A dynamic sealing ring made of a resilient flowable material such as an elastomer throughout, characterized by its cross-sectional configuration which in its free form is uniform and generally rectangular with arcuate smoothly contoured convex lobes at each of its corners, with its two opposed axially extending surfaces bearing additional annular convex sealing lobes in unequal numbers disposed in non-opposite relation between the adjacent corner lobes and separated therefrom and from each other by concavities and extending outwardly therebeyond a short distance to effect a more perfect seal, particularly when applied in encircling relation to a reciprocating piston rod and subjected to high gaseous pressures from a single direction or as a piston seal.

21 Claims, 3 Drawing Figures

MULTI-LOBED RECTANGULAR SEALING RING

DESCRIPTION

Background of Prior Art

Large numbers of dynamic sealing rings have heretofore been designed, being characterized almost solely by their different cross-sectional configurations. One of the most successful, if not the most successful of these rings is that disclosed in U.S. Pat. No. 3,550,990, which teaches that a more effective dynamic seal can be provided by providing a generally rectangular ring with convex corner lobes and an additional intermediate lobe upon each of a pair of its opposed surfaces, with each of such intermediate and opposed lobes extending outwardly beyond its adjacent corner lobes. I have found, however, that while such a ring functions in a far superior manner to most heretofore known rings under sealing conditions where the pressure changes directions, it is not as effective as desired when the pressure is gaseous, high, and in a single direction, and there is not a well-defined groove within which to position the ring. I have designed a ring, however, which out tests show functions in a far superior manner under such conditions, and can be manufactured and utilized under such conditions without substantial additional cost.

In recent years, a need has arisen for an improved seal in devices where high gaseous pressures in a single direction must be contained around a structure such as a rod and in which, for manufacturing reasons, no well defined groove is provided for a sealing ring. Thus, the single direction pressure holds the sealing ring in position. Examples of such usage are the devices utilized in automobiles of foreign manufacture to hold trunk hoods or doors in elevated position when opened. I have provided a seal which meets that need better than any heretofore known.

BRIEF SUMMARY OF THE INVENTION

I have developed a lobed generally rectangular sealing ring which functions under such conditions as described hereinabove in a far superior manner. My new ring is characterized by a pair of annular sealing lobes spaced from each other and from their adjacent corner lobes by concavities and extending inwardly from its internal diametric surface. The opposite or other diametrical surface of my ring carries a single annular sealing lobe positioned axially intermediate the pair of lobes carried by the ID or sealing surface. Each of the annular lobes extends outwardly a short distance beyond its adjacent corner lobes. The internal dimensions of the ring in its free form are slightly less than the diameter of the rod around which it is to perfect a seal. The ring is designed with radial dimensions such that the pair of intermediate lobes when applied to the surface to be sealed, such as a rod, are under slight compression. The single annular lobe has an outer diameter slightly in excess of the cavity within which the ring must operate and thus when installed, it is compressed slightly so as to cause the elastomer of the main body of the ring to flow toward and into the opposite concavities, and around the opposed pair of sealing lobes. My tests shows that a ring of this configuration performs under these conditions in a manner far superior to the performance of all other rings.

BRIEF DESCRIPTION OF THE DRAWINGS

A detailed description of one preferred embodiment of the multi-lobed rectangular sealing ring is hereafter described with specific reference being made to the drawings, in which.

DETAILED DESCRIPTION OF THE INVENTION

Figure 1:
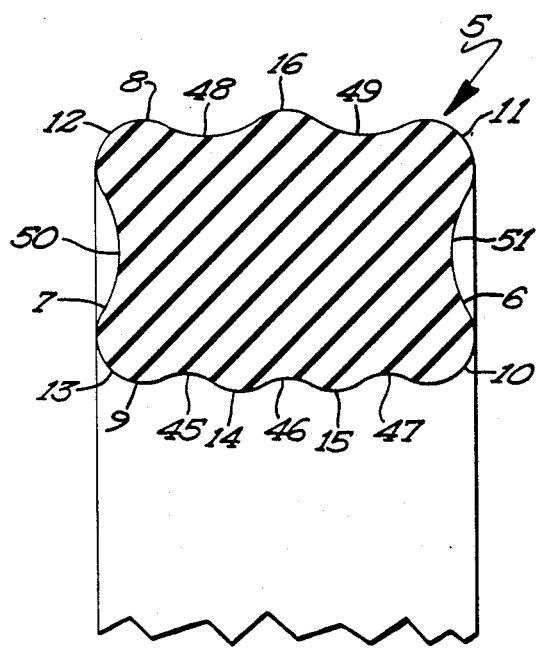
FIG. 1 is a fragmentary axial sectional view of my new sealing ring, having its primary sealing surface at its inner diameter.

The preferred embodiment of my invention is shown in FIG. 1 and is comprised of a continuously formed ring 5 made of a resilient flowable material such as rubber, or an elastomer, throughout. As shown, it is generally rectangular and uniform in cross-sectional configuration. The ring 5 has a set of two opposed generally radially extending surfaces 6 and 7 and a set of two opposed generally axially extending surfaces 8 and 9. At each of the corners of this ring, there is a smooth convexly-shaped sealing lobe 10, 11, 12 and 13, as shown.

In the form shown in FIG. 1, the internal diametrical surface 9 is the primary sealing surface and has a pair of spaced circumferentially extending annular sealing lobes 14 and 15 extending radially inwardly. The outer diametrical surface 8 is the secondary sealing surface and has a single annular sealing lobe 16 extending outwardly therefrom. The lobe 16 is disposed oppositely and, when considered axially, between the two lobes 14 and 15. Each annular sealing lobe 14, 15, and 16 resembles a crest having opposite arcuate sides.

Figure 2:
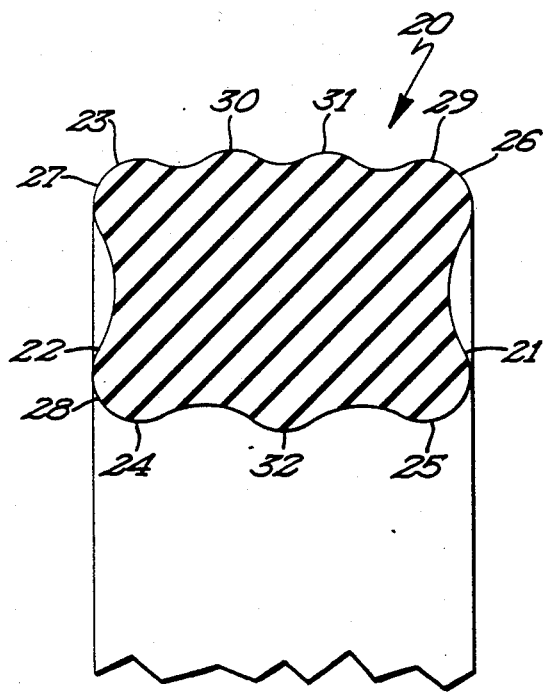
FIG. 2 is a fragmentary axial sectional view of another form of my new sealing ring, having its primary sealing surface at its outer diameter.

A second form of my invention is shown in FIG. 2 and is comprised of a continuously formed rectangularly shaped ring 20, also made of a resilient flowable material, such as rubber or an elastomer and uniform throughout. It also has a set of two opposed generally radially extending surfaces 21 and 22, and a set of two opposed generally axially extending surfaces 23 and 24. At each of the corners at which these surfaces intersect, there is a smooth convexly-shaped lobe 25, 26, 27 and 28. In the form shown in FIG. 2, the outer diametrical surface 29 is the primary sealing surface and has a pair of spaced circumferentially extending annular sealing lobes 30, 31 extending radially outwardly. The inner diametrical surface 24 is the secondary sealing surface and has a single smooth convexly-shaped annular sealing lobe 32 extending inwardly therefrom. The lobe 32 is disposed oppositely and, when considered axially, between the two lobes 30, 31.

Both forms of my invention are particularly effective in sealing gases at relatively high pressures. Since gases are more difficult to seal than liquids, it is imperative that such a seal be particularly effective. The form shown in FIG. 1 is particularly effective when used, for example, within a device such as a "gas spring", which is shown in FIG. 3.

The form shown in FIG. 2 can be used wherever the seal to be perfected is on the outer surface of the ring as, for example, on a piston riding within a cylinder wall, as in an air compressor.

Figure 3:
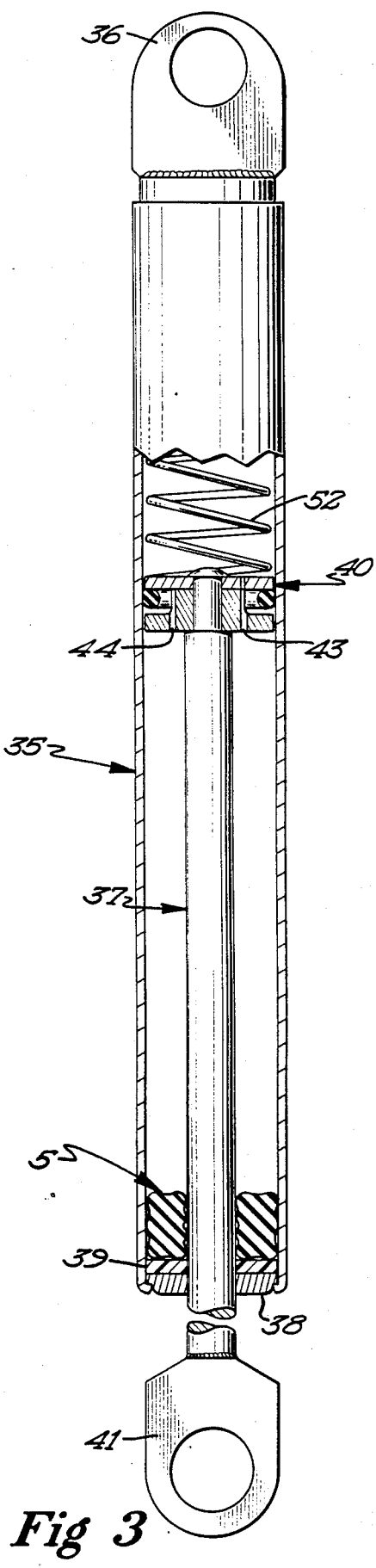
FIG. 3 is an elevational view of a gas-spring with parts thereof broken away to show one of my new sealing rings installed therein to perfect a seal of high gaseous pressure therewithin.

FIG. 3 shows a "gas spring" device used, for example, upon automobile trunk doors to hold the same in "open" position. As shown, it is comprised of a cylinder 35 having an attachment loop 36 at one end and being open at the other to accommodate a piston rod 37. Its open end is partially closed with a brass bushing 38 and a Teflon washer 39, the latter to prevent extrusion of the sealing ring 5.

The piston rod 37 reciprocates within the ring 5 and washer 39 and has a piston 40 at one end and an attachment loop 41 at the other. A light spring 42 bears against the outer end of piston 40 and urges piston rod 37 outwardly. The two rigid attachment loops 36 and 41 are used to connect the opposite ends of the device between the trunk door and the frame of the automboile. The interior of cylinder 35 is pressurized at approximately 2500–3000 p.s.i.

Piston 40 is constructed and arranged to permit gas to pass therethrough slowly, as through a plurality of openings, such as 43 and 44. A "gas spring", such as shown, is designed as a flow restrictor to permit leakage therethrough. In other words, it is a leaky piston. Such a device may be purchased from the Automotive Products Division at Marion, S.C., of AVM Corporation, as Part No. 1259327.

The radial dimension of the rings 5 and 20, as shown, is a 0.171 inches, taken through the corner lobes 10, 11 and is 0.185 when taken through the intermediate lobes 14, 15 and 16. Thus, the intermediate lobes extend outwardly 0.07 inches beyond their adjacent corner lobes. The axial dimension of these two rings is 0.250 inches.

The radius of each of the corner lobes 10, 11, 12 and 13 is 0.031 inches. The radius of each of the intermediate lobes 14, 15 and 16 is also 0.031 inches. The radius of the concave surfaces 45, 46 and 47 adjacent the lobes 14, 15 is also 0.031 inches, while the radius of the two concave surfaces 48, 49 adjacent lobe 16 is 0.045 inches. The radius of the two concave axially spaced sides 50, 51 is 0.062 inches. The internal diameter of the rings 5, 20 is 0.307 inches, taken at the corner lobes.

The radius of the various sealing lobes and concavities and the dimensions of ring 20 are the same as those for the corresponding parts of ring 5, the corresponding intermediate lobes 30, 31, 32 extending outwardly beyond their adjacent corner lobes to the same extent.

When installed, as shown in FIG. 3, my new ring seals in a more efficient manner than any heretofore known. The internal diameter of the ring 5 is slightly less than the diameter of the piston rod 37 which has a diameter of 0.315 inches. The external diameter of the ring 5 is 0.767 inches while the interior diameter of cylinder 35 is 0.748 inches. Thus, the ring 5 is compressed inwardly slightly by the interior surface of the walls of cylinder 35, and rod 37 stretches compression ring 5 because of its larger diameter. This causes some of the flowable material (rubber or elastomer) to flow from the various sealing lobes into their adjacent concavities, thereby effecting a more perfect seal despite the gaseous medium being sealed and the unusually high pressures. When a "gas spring", such as that shown in FIG. 3, is extended between a car trunk door and the frame of the automobile and connected thereby by loops 36, 41, the device is extended when the trunk door is opened. The force applied to the door causes the piston rod 37 and its piston 40 to shift within the cylinder 35 accordingly, the pressurized gas within the cylinder passing from one side of the piston to the other through the openings 43, 44. The light spring 52 and the restricted openings 43, 44 are sufficient to off-set the tendency of the door to close because of its own weight. When the automobile operator closes the door, the force applied to the door with its leverage is sufficient to move the gas through piston 40. Meanwhile, an effective seal is maintained by lobes 14, 15 around piston rod 37.

In considering this invention, it should be remembered that the present disclosure is illustrative only and the scope of the invention should be determined by the appended claims.

I claim:

1. A sealing device comprising a continuously formed ring made of a resilient flowable material throughout and adapted to fit within a device having a sealing surface of ringlike configuration,
    (a) said ring in its free form being uniform and generally rectangular in cross-sectional configuration and including a set of two opposed generally radially extending surfaces and a set of two opposed generally axially extending surfaces connected between adjacent portions of said radially extending surfaces;
    (b) a corner lobe being formed at each of the four corners defined between said radially and axially extending surfaces;
    (c) the exterior surface of each of said corner lobes in their free form being smoothly contoured and arcuately curved in shape;
    (d) one surface of one of said set of axially extending surfaces being a dynamic sealing surface and having at least a pair of spaced annular sealing lobes, each with a smoothly contoured convexly-shaped exterior disposed intermediate said corner lobes adjacent that surface and in its free form extending a short distance outwardly beyond said corner lobes adjacent said one surface;
    (e) the other surface of said set of axially extending surfaces being a passive sealing surface and having an outwardly extending annular sealing lobe with a smoothly contoured convexlyshaped exterior disposed intermediate said corner lobes adjacent said other surface and in its free form extending outwardly beyond said corner lobes adjacent said other surface.

2. The structure defined in claim 1 wherein the last mentioned said outwardly extending annular sealing lobe disposed intermediate said corner lobes adjacent said other surface is disposed intermediate said pair of spaced annular sealing lobes carried by said dynamic sealing surface.

3. The structure defined in claim 1 wherein said ring has an internal axially extending diametrical surface and said pair of spaced annular sealing lobes are disposed thereupon and extend radially inwardly therefrom.

4. The structure defined in claim 1 wherein each of said sealing lobes of said pair is disposed an equal distance from its adjacent said corner lobe.

5. The structure defined in claim 1 wherein each of said sealing lobes of said pair is separated from its adjacent said corner lobe and from each other by a shallow concavity in the surface of said ring supporting the same.

6. The structure defined in claim 1 wherein the convexly-shaped exterior of each lobe of said pair of annular sealing lobes defines a crest having opposite arcuate sides, each of said opposite arcuate sides being constructed and arranged to merge smoothly with an adjacent shallow concavity in the surface of said ring from which said lobes extend.

7. The structure defined in claim 1 wherein said radially extending surfaces are concaved.

8. The structure defined in claim 7 wherein said sealing lobe on said passive sealing surface is disposed axially intermediate said pair of lobes.

9. The structure defined in claim 7 wherein the area between said pair of spaced sealing lobes is concave along a line extending circumferentially of said ring midway between said pair of lobes.

10. The structure defined in claim 1 wherein each of said annular lobes on said dynamic sealing surface is of the same size and shape.

11. The structure defined in claim 1 wherein each of said annular sealing lobes extends outwardly the same distance beyond its adjacent corner lobes.

12. The structure defined in claim 1 wherein each of said corner lobes is of the same size and shape, and each of said annular sealing lobes is of the same size and shape, and each of said corner lobes is larger than said annular lobes.

13. The structure defined in claim 1 wherein said corner lobes are convexly-shaped and the radius of each approximates 18% of the cross-sectional radial dimensions of said ring.

14. The structure defined in claim 1 wherein said corner lobes are convexly-shaped and wherein each of the radially extending surfaces of the other set of two opposed surfaces is concaved and has a radius approximately twice the radius of each of said corner lobes.

15. The structure defined in claim 1 wherein said annular sealing lobes of said dynamic sealing surface in their free forms extend outwardly beyond said corner lobes a distance approximately 8% of the radial cross-sectional dimensions of said ring.

16. The structure defined in claim 1 wherein the areas at either side of said sealing lobes of said dynamic sealing surface are concaved and the volumetric protrusion thereof beyond the outer confines of the remainder of said ring is less than the combined volumetric concavities adjacent said sealing lobes of said dynamic sealing surface.

17. A gas spring including:
(a) a cylinder having an end opening in one end thereof;
(b) a piston mounted within said cylinder for longitudinal relative sliding movement therewithin;
(c) a piston rod carrying said piston and extending longitudinally of said cylinder and outwardly through its said opening;
(d) said cylinder having interior sealing surfaces adjacent said end opening and surrounding said piston rod;
(e) a sealing ring surrounding said piston rod and bearing against said interior sealing surfaces of said cylinder to effectively seal high pressure gases therewithin;
(f) said sealing ring in its free form being uniform and generally rectangular in cross-sectional configuration and having a set of two opposed generally radially extending surfaces and a set of two opposed generally axially extending surfaces connected between adjacent portions of said radially extending surfaces;
(g) a sealing corner lobe formed at each of the four corners defined between said radially and axially extending surfaces;
(h) the exterior surface of each of said corner lobes in their free form being smoothly contoured and arcuately curved in shape;
(i) said ring having an internal diametrical dynamic sealing surface having a pair of axially spaced annular sealing lobes under compression and bearing against the outer surface of said piston rod in gas-sealing relation, each of said sealing lobes in its free form having a smoothly contoured convexly-shaped exterior disposed intermediate the corner lobes adjacent thereto and extending a short distance outwardly beyond said corner lobes adjacent thereto; and
(j) said ring having an external diametrical sealing surface having a single annular sealing lobe extending under compression circumferentially therearound and which in its free form has a smoothly contoured convexly-shaped exterior disposed intermediate its adjacent corner lobes and extending outwardly a short distance therebeyond.

18. The structure defined in claim 17, wherein said sealing lobe carried by said external diametrical sealing surface is disposed axially intermediate said pair of sealing lobes carried by said internal diametrical surface.

19. The structure defined in claim 17, wherein said annular sealing lobes in their free form extend outwardly beyond their adjacent corner lobes a distance approximately 8% of the radial cross-sectional dimensions of said ring.

20. The structure defined in claim 17, wherein the internal diametrical dimensions of said ring in its free form are only slightly less than the diameter of said rod.

21. The structure defined in claim 17 wherein the internal diametrical dimensions of said ring in its free form are slightly less than the diameter of said rod and the external dimensions of said annular sealing lobe carried by said external diametrical surface of said ring in its free form slightly exceed the internal dimensions of said cylinder whereby said annular lobes carried by the internal diametrical surface of said ring are maintained under compression upon said rod.

* * * * *